Dec. 30, 1930.  E. B. MILLER ET AL  1,786,861
COMBINATION REFRIGERATING AND WATER HEATING UNIT
Filed Dec. 14, 1927
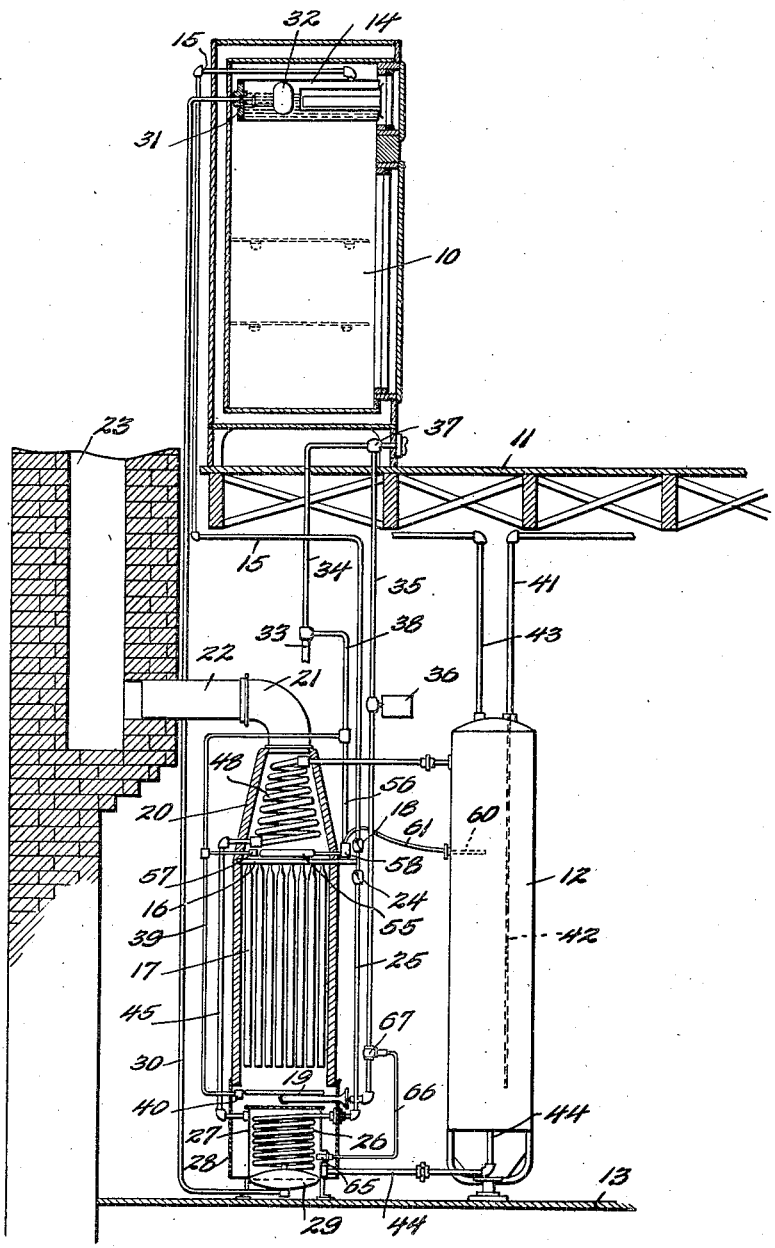
Inventor
E. B. Miller
Wm. H. Gabler
By Watson, Coit, Morse & Grindle
Attorney Patented Dec. 30, 1930

1,786,861

UNITED STATES PATENT OFFICE

ERNEST B. MILLER AND WILLIAM H. GABELER, OF BALTIMORE, MARYLAND

COMBINATION REFRIGERATING AND WATER-HEATING UNIT

Application filed December 14, 1927. Serial No. 240,052.

This invention relates to combination apparatus for refrigeration and water heating, and more particularly to apparatus in which the heat abstracted during, and that used for the purpose of refrigerating is transferred to water which is then delivered to a storage tank for domestic or other uses.

The novel features of the invention may be enumerated as follows:

(a) The provision of refrigerating apparatus in which the heat given off by the refrigerant when condensing is given up to water to initially heat the same for domestic or other uses.

(b) The provision of refrigerating apparatus in which heat is used periodically in the cyclic operation thereof together with means to transfer waste heat to water for domestic or other uses.

(c) The provision of an adsorption refrigerating system wherein the heat of adsorption is to a large extent transferred to water to assist in cooling the adsorbent and to heat the water for domestic or other purposes.

poses.

(d) The arrangement of a refrigerating system and a hot water storage apparatus for cooperative operation whereby four sources of heat for the water are provided.

(e) The arrangement of an adsorption refrigerating system making use of heat for cyclic operation, and a hot water storage system in which waste heat from the refrigerating system is used to heat water for storage, together with means automatically controlled by the quantity of stored hot water for providing auxiliary heat for the water in the event of insufficient waste heat from the refrigerating system.

The various objects of the invention consist in the provision of apparatus incorporating the above enumerated and other novel features.

Other and further objects and features of the invention will be more apparent to those skilled in the art upon a consideration of the accompanying drawing and following specification, wherein is disclosed a single exemplary embodiment of the invention with the understanding however, that various changes may be made therein such as fall within the scope of the appended claims without departing from the spirit of the invention.

The drawing comprises a single composite figure more or less schematically showing the necessary apparatus for carrying out the invention.

In said drawing, the invention is disclosed in connection with a domestic refrigerator 10, which is shown supported on the first floor 11 of a dwelling and with a domestic water storage tank 12 preferably located on the cellar floor 13 of the dwelling, although it is to be understood that the two portions of the apparatus may well be on the same floor, or may be separated by a greater space than shown.

In order to provide suitable refrigeration to maintain the storage space in the refrigerator 10 at a desired low temperature, there is arraged in the upper part of this refrigerator a cooling vessel or evaporator 14 adapted to contain a quantity of suitable liquid refrigerant. From the upper portion of this vessel 14 a pipe 15 leads to the header 16 of a suitable absorber, which may comprise the vertical tubes 17 closed at the bottom, communicating at their upper ends with the header 16 and filled with some form of absorbent material which is capable of adsorbing vapor from the liquid refrigerant in the vessel 14. Preferably a solid porous adsorbent material such as silica gel is provided in the absorber which is preferably constructed as shown in the copending application of Miller and Edel, Serial No. 65,465, filed October 28, 1925.

The header 16 of the adsorber communicates with the vessel 14 through the pipe 15 in which is interposed the check valve 18, which allows vapor to flow from 14 to 16 but closes when the pressure in 16 is greater than in 14. The adsorbent material in the adsorber becomes saturated after a period of adsorption and must be activated or regenerated by heating the same to drive off the vapor and again place the adsorbent in condition for further adsorption. Heat for this purpose is conveniently applied by means of gas burner 19 arranged beneath the adsorber and within the heat insulating casing 20 which encloses both the adsorber and the gas burner and communicates, through the elbow 21 and pipe 22 with a suitable flue or chimney 23 whereby the products of combustion from the burner 19 may be carried off.

During activation, the vapor, driven off from the adsorbent material, closes the check valve 18 and passes through the check valve 24, which opens when the pressure in the adsorber is raised. It then passes through the pipe 25 into the condenser coil 26 arranged in the closed tank 27 conveniently located beneath the burner and supported in the frame 28 which carries the heat insulating casing 20. The vapor enters at the top of the coil 26 and leaves, after being condensed, at the bottom where it is received in a condensate receiver 29. Liquid is conveyed from the condensate receiver through the pipe 30 back to the vessel 14. The quantity permitted to enter the vessel 14 is controlled by the valve 31 operated by the float 32 which serves to maintain constantly a suitable level of refrigerant in the vessel.

The operation of the refrigerating apparatus is as follows:

Starting with the adsorber free from vapor and in communication, through the pipe 15, with the upper portion of the vessel 14, which is never full of liquid. The adsorbent begins to adsorb vapor from the refrigerant and reduces the pressure on the surface thereof, thus causing the same to rapidly evaporate by absorbing heat from the material in the refrigerator. Thus evaporation lowers the temperature of the liquid and consequently of the storage space in the refrigerator.

The rapidly evolved vapor is adsorbed in the adsorbent contained in the tubes 17. Before this adsorbent becomes completely saturated the burner 19 is lighted and the adsorbent is heated sufficiently to drive off most of the vapor. The increased pressure of the vapor in the adsorber, due to the heating, closes the valve 18 and stops the cooling operation. It also opens the valve 24 and the vapor passes into the condenser 26 where it is cooled and liquefied. The liquid falls by gravity into the condensate receiver 29 and a sufficient quantity, to maintain the proper level of refrigerant in the vessel 14, is lifted in the pipe 30 by the reduced pressure in the vessel 14 during the succeeding adsorption period. The valve 31 prevents an excess flow of liquid, due to the difference in pressure between the vessel 14 and the condensate receiver 29.

Gas from the main 33 passes through the pipe 34 and pipe 35 into the burner 19. In order that the refrigerating apparatus may operate in cycles, the gas is intermittently turned on and off by means of the clock valve 36, which thus fixes a definite time for heating the adsorber and a definite time for absorbing. The quantity of cooling and thus the temperature of the refrigerator may be regulated by the manually operable regulating valve 37 between the pipes 34 and 35. Operation of this valve does not effect the period of the cooling and actuating portions of the cycles, but merely controls the amount of heat supplied to the adsorbent and hence alters the amount of vapor driven off from the same and its subsequent capacity for absorbing. The burner 19 is lighted by means of a continuously burning pilot light 40, which receives gas from the main through the pipes 38 and 39.

The water heating and storage apparatus comprises, as before mentioned, the storage tank 12 of any convenient form adapted to be supplied with cold water from the usual source of water supply through the pipe 41 which leads through the top of the tank and is provided with an extension 42 to deliver cool water substantially to the bottom of the tank. Hot water is delivered from the top of the storage tank by the pipe 43 and is available for domestic or other desired uses. From the bottom of the storage tank a pipe 44 leads into the bottom of the tank 27 surrounding the condenser in order that cold water may be supplied for cooling the condenser. Water which is heated by the condenser rises and leaves the tank 27 through the pipe 45, which conducts it into the conical spiral coil 48 arranged within the upper end of the heat insulating case 20 above the adsorber. A pipe 49 conducts water from the heating coil 48 back to the storage tank near its upper end.

It will be seen that if heat is applied anywhere within the circuit 44, 27, 45, 48 and 49 that a thermosiphonic action will take place which will cause a circulation of cold water from the bottom of the storage tank and this water will be heated and delivered to the upper portion of the storage tank for use. It will also be seen that the water will first be heated, not only from the latent heat of condensation of the refrigerant in the condenser, but also from the sensible heat of this refrigerant. The water thus partly heated flows into the heating coil 48 where it takes up heat which is wasted by the adsorber, that is, heat from the burner 19 which is not completely absorbed by the adsorber.

When the adsorber is on the adsorption portion of the cycle no heat is being supplied by the burner 19, but the adsorber rises in temperature, due to the exothermic action of the adsorption process and the heat given off in this manner passes over the coils 48 and assists in heating the water. The chimney 23 provides a suitable draft to cause the circulation of air through the housing 20 in such a manner as to carry this heat over the coils 48.

Immediately after the activating portion of each cycle there follows a period in which the adsorber cools down sufficiently to begin adsorbing again. During this period, the induced draft helps to rapidly cool the adsorber and to carry the heat thereof over the coils 48.

In the event that water is drawn from the storage tank 12 more rapidly than it can be heated by the heat given off in the refrigeration apparatus, additional heat may be applied to the coil 48 by means of the supplemental gas burner 55 located between the top of the adsorber and the bottom of the coils 48 and supplied with gas from the main through the pipes 38 and 56. This burner is adapted to be lighted by means of a pilot burner 57 connected to the pilot burner supply pipe 39. A valve 58 is interposed between the pipe 56 and the burner 55 and this valve is normally maintained closed when the temperature of the water at a predetermined level in the storage tank is at least as high as desired. When the temperature at this level is reduced below the predetermined desired temperature the valve 58 opens and allows supplemental heat to be applied to the coils 48. It will be noted that the supplemental burner is above the adsorber and if it is in operation during the adsorption period, only serves to increase the draft in the chimney 23 and draw more cool air into the bottom of the casing 20 thus serving to cool the absorber and rendering it more effective. The valve 58 may be controlled by a suitable thermostatic unit 60 located in the boiler at a suitable predetermining level below the top of the boiler to maintain a desired reserve of hot water. When this reserve is reduced in quantity, cold water entering through the pipe 42 comes into contact with thermostat 60 which then acts through the connection 61 to open the valve 58 and allow additional heat to be supplied to reestablish the desired quantity of hot water in the storage tank. Obviously the thermostat can be located at any desired level in the heater and can be set for any desired temperature.

In the event that water is heated and stored in the tank 12 more rapidly than it is used it will be seen that in time a full tank of water will be obtained. It is not desirable to have the water overheated for obvious reasons and in order to prevent this means are provided to shut off the flow of gas to the burner 19 automatically. It will be seen that an accumulation of hot water will cause it to circulate into jacket or case 27 which surrounds the condenser coil 26 and the temperature of the water in this jacket will become greater than that which will be imparted to it by the condenser. A thermostat element 65 is inserted in the casing as shown and connected by a tube 66 to the pressure controlled valve 67 in the gas line 35 leading to the burner 19. The heating of the thermostat element 65 above the desired temperature in the casing 27 causes an expansion of the liquid in the element which is transmitted through the tube 66 to the operating mechanism of the valve 67 which will close the same and extinguish the light at the burner 19. The valve 67 will remain closed until sufficient water is drawn off from the tank 12 or until the water therein cools sufficiently to lower the temperature in the casing 27 below that predetermined by the operation of the thermostatic valve. The refrigerating apparatus can then resume its normal cyclic operation in accordance with the time valve 36.

It will be seen from the above description that an economic arrangement of apparatus has been provided whereby substantially all heat wasted by the refrigeration system is given up to water which is used for domestic purposes. It will furthermore be noted that there is no waste of water used for cooling the refrigeration apparatus. In addition, means are provided to insure a constant and steady supply of hot water irrespective of the quantity of waste heat provided by the refrigerating system.

Having thus described the invention, what is claimed as new and desired to be secured by Letters Patent is:

1. Apparatus for refrigerating and for heating water including in combination, a water storage tank, an adsorber, means to supply heat to said adsorber to activate the adsorbent therein and means to transfer unused heat from the said heat supply means directly to water in said storage tank.

2. Apparatus for refrigerating and for heating water including in combination, a storage tank for water, adsorption refrigeration apparatus and means to transfer substantially all waste heat from said apparatus to water in said tank.

3. Apparatus for refrigerating and for heating water including in combination, a storage tank for water, refrigeration apparatus including a source of heat for vaporizing the refrigerant and means to transfer heat ineffective for said vaporizing from said source to water in said tank.

4. Apparatus for refrigerating and for heating water including in combination, a storage tank for water, a circulating water heating system connected to said tank, a refrigerating system including an adsorber, means to heat said adsorber, a portion of said circulating system being arranged to receive unused heat from said adsorber heater.

5. Apparatus for refrigerating and for heating water including in combination, a storage tank for water, a circulating water heating system connected to said tank, a refrigerating system including an evaporator, an adsorber, a condenser and means to heat said adsorber, said circulating system being arranged to bring water from said tank into contact with said condenser and then into the path of waste heat from said adsorber.

6. Apparatus for refrigerating and for heating water including in combination, a storage tank for water, an adsorber, an an evaporator connected to said adsorber, a condenser connected at one end to said adsorber and at the other to said evaporator, a casing surrounding said condenser, a source of heat beneath said adsorber, a coil above said adsorber and a circulating water heating system connected to said tank and including said casing and said coil.

7. Apparatus for refrigerating and for heating water including in combination, a storage tank for water, an adsorber, a condenser directly connected to said adsorber, a casing surrounding said condenser, a source of heat beneath said adsorber, a circulating water heating system connected to said tank and including said casing, and a coil in said system arranged to receive heat rising from said adsorber.

8. Apparatus for refrigerating and for heating water including in combination, a storage tank for water, a circulating water heating system connected to said tank, a refrigerating system including an adsorber, a source of heat beneath said adsorber, a source of heat above said adsorber and a coil directly above said second source of heat and in the path of heat from said first source and in circuit with said circulating system.

9. Apparatus for refrigerating and for heating water including in combination, a storage tank for water, a refrigerating system including a source of heat, means to heat water in said tank by unused heat from the said source, a source of auxiliary heat for said water and means controlled by the quantity of heated water stored in said tank to operate said auxiliary source of heat.

10. Apparatus for refrigeration and for heating water including in combination, a storage tank for water, a refrigerating system including a condenser, an adsorber and a source of heat for said adsorber, means to heat said water from said condenser and from unused heat from said adsorber heater, an auxiliary source of heat for said water and means to apply said auxiliary source of heat when insufficient heat is supplied by said refrigerating system.

11. Apparatus for refrigeration and for heating water including in combination, a storage tank for water, a circulating water heating system connected to said tank, a refrigerating system including an adsorber and a condenser, a burner for said adsorber, a casing in said water circulating system surrounding said condenser, a heating coil in said circulating system above said adsorber to use heat passing the adsorber, a second burner and means to control the flow of fuel to said second burner in accordance with the temperature of the water in said tank at a predetermined level.

12. Apparatus for refrigeration and for heating water including in combination, a storage tank for water, a circulating water heating system connected to said tank, a refrigerating system including an adsorber, means to heat said adsorber intermittently for definite periods, means to regulate the quantity of heat supplied at each period, a heating coil in said circulating system, said coil being positioned to receive heat from said adsorber heater which is unused by said adsorber and means to automatically supply auxiliary heat to said coil when the quantity of hot water in said tank falls below a predetermined amount.

13. Apparatus for refrigeration and for heating water including in combination, a storage tank for water, a circulating water heating system connected to said tank, a refrigerating system including an adsorber, an evaporator in communication with said adsorber and containing a liquid refrigerant, a coil in said circulating system arranged in proximity to said adsorber to receive heat of adsorption therefrom, and another means to heat said coil.

14. Apparatus for refrigeration and for heating water including in combination, a tank, an adsorber, a gas burner adapted to intermittently supply heat thereto, an evaporator associated with said adsorber, a condenser associated with said adsorber and said evaporator, a gas burner above said adsorber, a circulating water heating system connected to said tank and including a casing surrounding said condenser, and a coil above said second burner and adsorber, a heat insulating casing surrounding said adsorber, burners and coil, and means to supply gas to said second burner to heat said coil when there is insufficient hot water in said tank.

15. A method of refrigerating and heating liquid comprising, adsorbing vapor from a liquid refrigerant into an adsorbent, supplying heat to said adsorbent to drive off said vapor and subjecting liquid from an independent source to heat escaping from said activating process.

16. A method of refrigerating and heating liquid comprising evaporating a liquid refrigerant, absorbing the vapor therefrom into an adsorbent, heating said adsorbent to drive off the vapor and simultaneously passing a liquid through a zone of heat wasted in said activating process to heat the same.

17. A method of refrigerating and heating liquid comprising evaporating a liquid refrigerant, adsorbing the vapor therefrom into an adsorbent, heating said adsorbent to drive off the vapor, transferring heat of condensation from said vapor to a liquid to initially heat the same and then subjecting said liquid to heat unused in said activating process to further heat the same.

18. A method of refrigerating and heating liquid comprising evaporating a liquid refrigerant, adsorbing the vapor therefrom into an adsorbent, heating said adsorbent to drive off the vapor, condensing said vapor and transferring heat of adsorption, heat of condensation and heat wasted in the activation process to a liquid.

19. A method of refrigerating and heating liquid comprising evaporating a liquid refrigerant, adsorbing the vapor therefrom into an adsorbent, heating said adsorbent to drive off the vapor, condensing said vapor and transferring heat of adsorption, heat of condensation and heat wasted in the activation process to a liquid, and automatically supplying additional heat to said liquid when heat from the refrigeration processes is insufficient to maintain a predetermined temperature thereof.

20. A method of refrigerating and heating liquid comprising evaporating a liquid refrigerant, adsorbing the vapor therefrom into an adsorbent, heating said adsorbent to drive off the vapor, condensing said hot vapor, heating a liquid partially by the heat of condensation and adding to said partially heated liquid a portion of the heat unused in driving off said vapor.

21. Apparatus for refrigerating and for heating water including in combination a water storage tank, an adsorber, means to supply heat to said adsorber to activate the adsorbent therein, means to transfer waste heat from said process to water in said storage tank, and means to cut off said heat supply upon an accumulation of an excess quantity of hot water.

22. Apparatus for refrigerating and for heating water including in combination, a storage tank for water, a circulating water heating system connected to said tank, a refrigerating system including an adsorber, means to heat said adsorber and a condenser, a portion of said circulating system surrounding said condenser and a portion being arranged to absorb heat wasted by said adsorber, and means to stop the heating of said adsorber upon the accumulation of an excess of hot water.

23. Apparatus for refrigerating and for heating water including in combination, a storage tank for water, a circulating water heating system connected to said tank, a refrigerating system including an adsorber, means to heat said adsorber and a condenser, a portion of said circulating system surrounding said condenser and a portion being arranged to absorb heat wasted by said adsorber, and means to stop the heating of said adsorber when the water surrounding said condenser reaches a predetermined temperature.

24. Apparatus for refrigeration and for heating water including in combination, a storage tank for water, a circulating water heating system connected to said tank, a refrigerating system including an adsorber and a condenser, a burner beneath said adsorber, a burner above said adsorber, a casing in said water circulating system surrounding said condenser, a heating coil in said circulating system above said adsorber and second burner, means to control the flow of fuel to said second burner in accordance with the temperature of the water in said tank at a predetermined level, and means controlled by the temperature of water in said casing to shut off fuel to said first burner.

In testimony whereof we hereunto affix our signatures.

ERNEST B. MILLER.
WILLIAM H. GABELER.